March 12, 1963   L. R. KOLLER   3,081,201
METHOD OF FORMING AN ELECTRIC CAPACITOR
Original Filed May 15, 1957
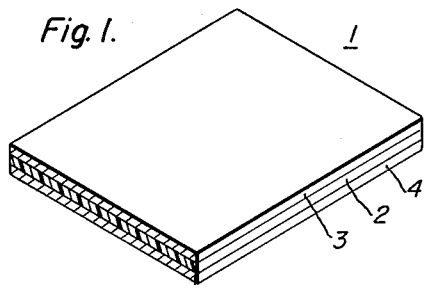
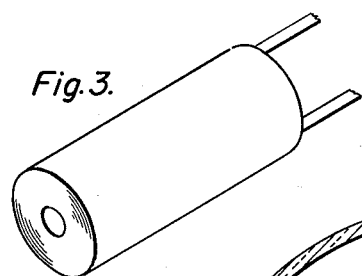
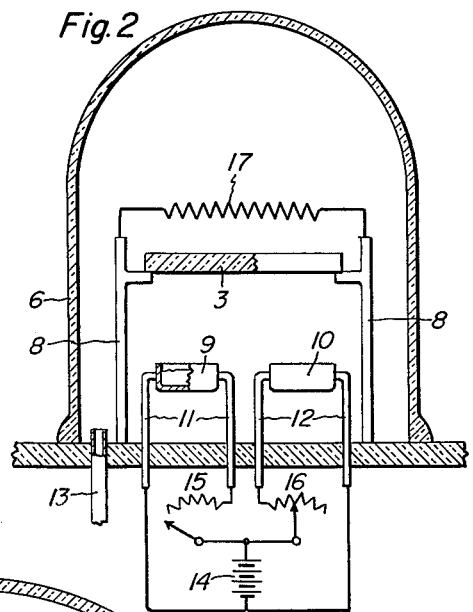
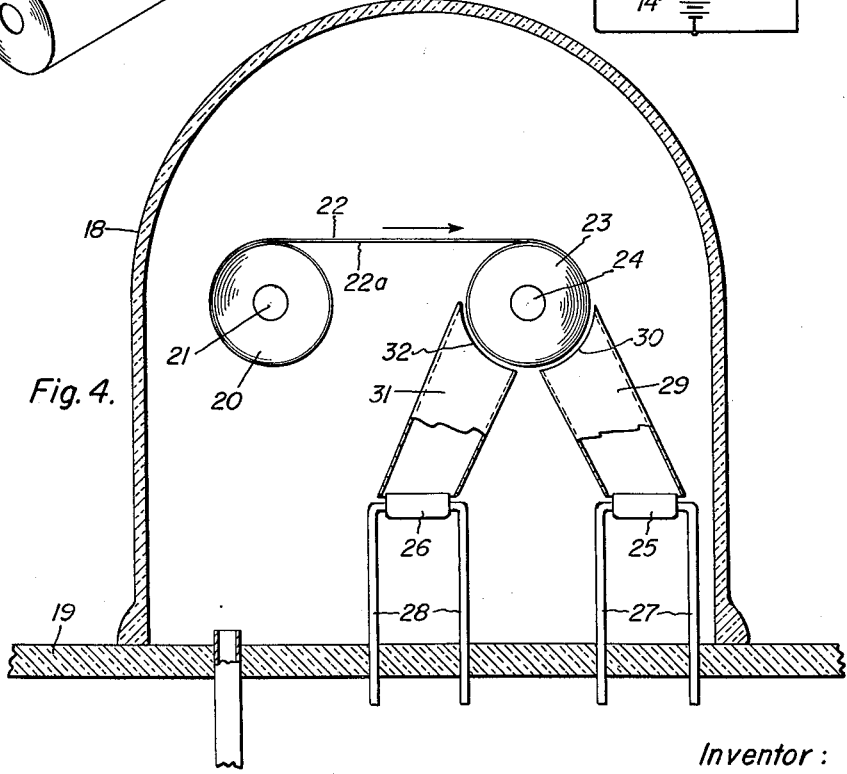
Inventor:
Lewis R. Koller,
by John F. Ahern
His Attorney.

United States Patent Office 3,081,201
Patented Mar. 12, 1963

3,081,201
METHOD OF FORMING AN ELECTRIC
CAPACITOR
Lewis R. Koller, Schenectady, N.Y., assignor to General
Electric Company, a corporation of New York
Original application May 15, 1957, Ser. No. 659,285,
now Patent No. 2,975,345, dated Mar. 14, 1961. Divided and this application May 20, 1960, Ser. No. 30,501
3 Claims. (Cl. 117—215)

The present invention relates to improved electric capacitors and to methods for manufacture thereof.

This is a division of my copending application Serial No. 659,285, filed May 15, 1957, now Patent No. 2,975,345, and entitled "Electric Capacitor."

It is well-known that electric capacitors may be manufactured by vacuum evaporation techniques wherein either the capacitor dielectric, the electrodes thereof, or both, are formed by evaporation and condensation of the constituent materials in an evacuated enclosure. Capacitors manufactured in this manner exhibit high capacity per unit volume. Additionally, due to the accurate controls which may be maintained in the evaporation process, capacitance values may be accurately controlled. Such capacitors are of particular utility for use with printed circuits.

The process of manufacturing evaporated capacitors, however, is not without its difficulties. Materials possessing high dielectric constant, high dielectric strength, low power factors and other characteristics, desirable in dielectric materials, are often not well suited to vacuum evaporation techniques for the production of thin layers thereof. Thus, for example, quartz and aluminum oxide, two commonly used dielectric materials, are extremely difficult to evaporate with proper control.

Accordingly, one object of the present invention is to provide evaporated electric capacitors having high capacity, high dielectric strength, and low power factor.

Another object of the present invention is to provide electric capacitors, the dielectric of which comprises a material having good dielectric characteristics which may be readily formed into thin layers by vacuum evaporation.

In accord with one embodiment of the invention, I provide an electric capacitor comprising an amorphous, vacuum evaporated layer of zinc sulfide containing a small amount of manganese spaced between a pair of conducting electrodes. The amorphous layer of zinc sulfide and manganese possesses highly desirable dielectric characteristics and may readily be prepared in thin, uniform layers by vacuum evaporation. In accord with another feature of the invention, a rolled cylindrical capacitor is formed by simultaneously evaporating a dielectric layer and a conducting layer upon a conducting sheet as it is wound upon a suitable mandrel.

The novel features believed characteristic of the invention are set forth in the appended claims. The invention itself, together with further objects and advantages thereof may best be understood with reference to the following description taken in connection with the attached drawing in which;

FIGURE 1 represents a parallel plate capacitor constructed in accord with one embodiment of the invention;

FIGURE 2 represents apparatus suitable for preparing the device in FIGURE 1;

FIGURE 3 represents an alternative device constructed in accord with the invention; and FIGURE 4 represents apparatus suitable for the production of the device of FIGURE 3.

In FIGURE 1, a parallel plate capacitor, represented generally as 1, comprises a dielectric layer 2 in parallel spaced relation between a pair of conducting electrodes 3 and 4. Dielectric material 2 comprises an amorphous layer of high purity zinc sulfide containing from 0.01 to 10.0 weight percent of elemental manganese. Capacitor plate or electrode 3 is composed of a conducting material and may conveniently be a thin metallic plate of a suitable material as for example silver, aluminum, copper, tin or any other metal conventionally utilized as a capacitor plate. Since capacitor 1 is prepared by vacuum evaporation, it is generally preferable that plate 3 be a rigid plate upon which layers 2 and 4 may be evaporated. It is not necessary, however, that capacitor plate 3 be a metal. Thus, for example, capacitor plate 3 may be a thin plate of glass, Pyrex glass, Vycor glass or quartz having thereupon a thin conducting layer of evaporated metal, tin oxide known as conducting glass, or a reduced film of titanium dioxide.

Capacitor plate 4 may be any conducting material which may be suitable for a capacitor plate and may conveniently comprise any of the materials set forth with respect to capacitor plate 3. Preferably, however, capacitor plate or conducting electrode 4 comprises a thin evaporated layer of a readily volatilizable metal such as silver, copper, tin, aluminum, zinc, gold or manganese.

The parallel plate capacitor illustrated in FIGURE 1 may readily be prepared in the apparatus illustrated schematically in FIGURE 2. In FIGURE 2, the apparatus comprises an evacuable reaction chamber or bell jar 6, mounted upon, and vacuum sealed to, a suitable insulating base member 7. One plate of the capacitor to be formed in the apparatus of FIGURE 2, in this case capacitor plate 3, is mounted horizontally upon supporting members 8 within the reaction chamber. A pair of evaporation vessels or boats 9 and 10 are mounted directly under capacitor plate 3 and are symmetrically located with respect to the center thereof. Evaporation boats 9 and 10 are supported by conducting support members 11 and 12 respectively, which also serve as electrical contacts thereto. Evaporation boats 9 and 10 are constructed of a high resistance, refractory, conductive material such as tungsten, molybdenum or like metals, which may be heated to incandescence by the passage of an electric current therethrough. An exhaust conduit 13 passes through vase 7 and is connected to an exhaust pump, not shown, to maintain proper low pressure atmosphere within reaction vessel 6. A source of electric power, represented conventionally by battery 14, is utilized to supply electric power to evaporation boats 9 and 10 through potentiometers 15 and 16 respectively. Potentiometers 15 and 16 may be utilized to supply a regulated electric current simultaneously or sequentially to evaporation boats 9 and 10. A resistance heating element 17, heated by a source of electricity, not shown, is located in close proximity to plate 3 for de-gassing and heating purposes. Evaporation boats 9 and 10 may conveniently be located at a distance of approximately 4 to 6 inches below capacitor plate 3. If only a portion of plate 3 is to have a capacitor formed thereon, as in printed circuit techniques, a suitable mask may be interposed between plate 3 and the evaporation boats.

In forming the device of FIGURE 1, in accord with one aspect of the invention, a metallic capacitor plate, as for example a one-half inch square plate of aluminum is placed upon support members 8. A small quantity of high purity zinc sulfide mixed with sufficient elemental manganese to cause a film formed upon plate 3 to contain 0.01 to 10.0 weight percent of manganese is placed within evaporation boat 9. It has been observed that the proportion of manganese within the evaporated films is usually greater than the proportion within the evaporation boat. The exact change in proportion depends upon the system geometry and the operating conditions. A small quantity of a material which is to comprise evaporated capacitor plate 4, as for example aluminum, is placed within evaporation boat 10. Bell jar 6 is sealed to base 7 and the apparatus if exhausted to a very low pressure which should be no greater than approximately 5 microns of mercury. I prefer, however, that the process be conducted at pressures of less than 0.05 micron. When the suitable chosen operating pressure has been attained, electric current is supplied through evaporation boat 9 containing the zinc sulfide and manganese, raising the temperature of the evaporation boat to a temperature in excess of 1000° C. The evaporation of the zinc sulfide and manganese may be conducted at a temperature from 1000° C. to 2000° C. Below 1000° C., the zinc sulfide and the manganese do not evaporate to any appreciable extent. Above 2000° C., the zinc sulfide and the manganese are volatilized too rapidly, causing the formation of an uneven particulate film upon capacitor plate 3. I have found that superior dielectric layers are produced when the temperature of evaporation boat is maintained at approximately 1500° C.

During the evaporation of the zinc sulfide and the manganese, I have found that it is essential that capacitor plate 3, which comprises the evaporation substrate, be maintained unheated or at a temperature of approximately 25° C., which is approximately room temperature. This is because I have found that evaporated films of zinc sulfide formed at substrate temperatures of approximately 100° C. or higher possess a crystalline structure whereas films of zinc sulfide deposited at substrate temperatures lower than approximately 100° C. are amorphous. The crystalline structure is not suitable for electric capacitors, since the crystalline zinc sulfide has a lower dielectric strength, and results in inferior dielectric characteristics in general. Accordingly, in the practice of my invention, the substrate 3, upon which the zinc sulfide and manganese film is formed, is preferably maintained at approximately room temperature so that the zinc sulfide and manganese film is amorphous. The amorphous zinc sulfide and manganese film has been found to possess highly satisfactory dielectric characteristics. However, since crystalline zinc sulfide films adhere to metal and glass substrates better than amorphous films, it may be desirable to first form upon the substrate, a thin film of crystalline zinc sulfide of infinitesimal thickness to insure proper adhesion.

The evaporation of the zinc sulfide and the manganese from evaporation boat 9 may be carried on for any period of time sufficient to produce a desired thickness of dielectric film 2. This thickness may conveniently be 1 to 20 microns. With evaporation boat 9 maintained at a temperature of approximately 1500° C., and approximately 4½″ below plate 3, the dielectric film of zinc sulfide and manganese is deposited at a rate of approximately 1 micron per minute. Accordingly, the evaporation time may readily be controlled to secure a film of zinc sulfide and manganese which is any desired thickness.

After the desired thickness of the dielectric layer has been secured by vacuum evaporation, the electrical power supply to evaporation boat 9 is interrupted at rheostat 15. Electrical power is then supplied to evaporation boat 10 through rheostat 16 to cause the evaporation, upon dielectric layer 2, of a thin film of a conductive material such as copper, aluminum, silver, gold, zinc, tin or manganese, to form the second capacitor plate or electrode 4. The temperature at which boat 10 is maintained for the evaporation of electrode 4 will, of course, vary depending upon the material which is utilized. Techniques for the evaporation of metals are well-known to the art and will not be discussed herein. It is only necessary that the evaporated layer of conducting material be sufficiently thick to provide good electrical conductivity. Conveniently, electrode 4 may be approximately 0.1 to 1.0 micron thick.

One evaporated capacitor prepared in accord with the present invention was prepared as follows:

A one-half inch square Pyrex glass plate 1/16″ thick was washed and cleaned with aluminum oxide abrasive. The plate was placed in the bell jar illustrated in FIGURE 2 of the drawing. 3 grams of zinc sulfide containing 1.0 weight percent of manganese was placed in boat 9 and 200 mg. of aluminum was placed in boat 10. Bell jar 6 was evacuated to an atmosphere of less than 1 micron of mercury. The plate was heated to a temperature of 400° C. for 5 minutes, then cooled to 100° C. for 10 minutes. While the plate was maintained at this temperature, sufficient aluminum was evaporated onto glass plate 3 from tungsten boat 10 to form an opaque film (a thickness of 0.1 micron). Tungsten boat 10 was heated to 1500° C. in the performance of this operation. The temperature of the substrate was then raised to 400° C. by resistance heater 17, and the temperature of boat 9 was raised to a temperature of 1500° C. until a very thin film, approximately 0.1 micron thick, was deposited upon the aluminum. The thickness of this film was noted by one order of interference color changes of the glass plate. Thereafter, the heat was removed and the glass plate was allowed to cool to room temperature. After the glass plate had reached room temperature, the temperature of evaporation boat 9 was again raised to 1500° C. until all the zinc sulfide had evaporated therefrom. After the zinc sulfide had been exhausted, evaporation boat 10 was again heated to 1500° C. and another opaque film of aluminum approximately 0.1 micron thick was evaporated onto the evaporated zinc sulfide and manganese layer. The electrical power was then disconnected, the bell jar was opened and the capacitor was removed.

The capacitor evaporated by the above process was subjected to standard electrical bridge capacitance measurements, and exhibited a capacitance of 0.002 microfarad at 50 volts A.C. This capacitor was tested at frequencies of 60, 120, 180, 240, 300, 360, 600 and 1000 cycles per second and in all instances exhibited a dielectric constant of 12 and a power factor of 0.003. With 50 volts between the capacitor plates, the capacitor maintained these values of dielectric constant and power factor at temperatures of 26° C., 57° C. and 82° C. After the temperature had been raised to 88° C. the power factor rose to 0.023. The temperature was not increased to breakdown. This capacitor could not be tested for dielectric strength since the above heat test was destructive.

A second capacitor was made by the same steps and controls as above. A 2″ diameter Pyrex disk was the substrate. A 1.0″ square aluminum electrode 0.1 micron thick was evaporated upon the glass through a mask. A first layer of zinc sulfide and manganese 0.1 micron thick was evaporated while the substrate was at 300° C. With the substrate at 25° C. a 4.8 micron thick layer of zinc sulfide and 1.0% manganese was formed and then an aluminum electrode 2 cm. square and 0.1 micron thick was formed upon the dielectric layer. The capacitor was then tested to high voltage breakdown, failing at a voltage of 200 v. This indicated a dielectric strength of 415 kv. per cm.

The capacitor described hereinbefore is a parallel plate capacitor. The invention, however, it not limited to parallel plate capacitors, but includes many other configurations. Thus, for example, capacitors in accord with this invention may be prepared in the conventional wound or rolled configuration, illustrated in FIGURE 3, wherein alternate layers of dielectric and conducting material are wound upon a mandrel to form a cylindrical capacitor.

In accord with another feature of my invention the apparatus of FIGURE 4 may be utilized for the production of a wound cylindrical evaporated capacitor. In FIGURE 4, a bell jar 18 is mounted upon, and vacuum sealed to, base 19. Within bell jar 18, a roll 20 of a flexible conducting material, as for example, aluminum foil, is mounted upon a mandrel 21 adapted for easy rotation. Mandrel 21 is supported within jar 18 by a suitable means (not shown). A thin sheet of aluminum foil 22, for example, is unrolled from roll 20 and is rolled upon capacitor assembly 23 which is wound upon a mandrel 24 and rotates therewith. In order to prevent the capacitor formed in accord with this feature of the invention from being electrically short-circuited by the winding of the capacitor, the metallic film 22, before winding upon roll 20, is suitably treated, as for example by surface oxidation, so as to have upon the undersurface thereof a non-conducting electrically insulating film 22a. Alternatively, roll 21 may comprise a double roll of a conducting metal such as aluminum and an insulating dielectric, as for example insulating paper.

In yet another alternative, roll 20 may comprise a thin rolled strip of a suitable organic plastic such as Mylar or polystyrene approximately 10 microns thick, having thereupon a film of evaporated metal such as silver, aluminum or gold approximately 0.1 to 1 micron thick. In all instances, however, insulating layer 22a should be as thick or thicker than the dielectric layer to be deposited to prevent undesired changes in capacitance.

Means for simultaneously evaporating a suitable dielectric material and a suitable conducting material thereupon to form a second plate of the capacitor are provided in the form of evaporation boats 25 and 26 mounted respectively upon supporting and conducting means 27 and 28. A shield member 29 is located between evaporation boat 25 and capacitor 23 so as to direct the vaporized material evaporated therein to a first portion 30 of the external cylindrical surface of capacitor 23. A second shield member 31 is located between evaporation boat 26 and capacitor 23 to direct the vapors of the materials evaporated therein to a second portion 32 of the external cylindrical surface of capacitor 23. Since the diameter of capacitor 23 changes constantly, shields 29 and 31 may be progressively enlarged by a suitable mechanical control means, to properly direct the respective vapors. Both first portion 30 and second portion 32 of the external cylindrical surface of capacitor 23 are chosen to be mutually exclusive of each other and to be upon that portion of the cylindrical surface of the capacitor which has already been wound. This is because the evaporated dielectric film is generally brittle and non-flexible. Accordingly, if the dielectric film were to be vaporized and deposited upon a portion of the metallic sheet 22, before it has become conformed to the cylindrical surface of the capacitor, any further flexing of the film would cause flaking of the dielectric.

In practice, foil 22 continually unrolls from roll 20 and rolls upon capacitor 23. As a certain portion thereof passes through region 30, which is near in the direction of rotation of the cylinder, to the point at which sheet 22 conforms to the surface of the cylinder, a suitable dielectric, for example zinc sulfide, is evaporated thereupon continuously. As it passes through region 32, which is remote, in the direction of rotation, from the point at which sheet 22 conforms to the surface of the cylinder, a suitable conducting material, for example aluminum, is continuously vaporized over the dielectric layer. Thus, the vapors of the dielectric material are selectively directed to a first portion of the cylinder following the point at which the sheet 22 first conforms to the cylindrical shape thereof to deposit a thin dielectric layer on the outer surface of the sheet. At the same time the vapors of the conducting material are selectively directed to a second portion of the cylinder angularly displaced in the direction of rotation of the body from the first portion so that a thin electrically conducting layer is deposited upon the dielectric layer. Accordingly, a continuous roll of a four layer laminate is continuously wound upon mandrel 24. This continuous roll comprises the original metallic foil 22, insulating film or layer 22a, the dielectric evaporated thereupon at 30, and the metal evaporated thereupon at 32.

After the desired diameter of capacitor 23 has been attained, electrical power to the evaporation boats (not shown, but identical with the power supplies illustrated in FIGURE 2) is discontinued and the capacitor is removed from the apparatus. Electrical contacts may conveniently then be made to the last formed portion of the film which may then be suitably wound and glued as is conventional with this type capacitor. Although the practice of this embodiment of the invention preferably is performed utilizing the zinc sulfide and manganese dielectric described hereinbefore, other dielectrics such as $MgF_2$, $CaF_2$ and cryolite may also be utilized. Also, any suitable metal foil may be utilized, and the evaporated metal may likewise be any suitable volatizable metal, such as those mentioned hereinbefore.

While the invention has been described with respect to particular embodiments in the foregoing disclosure, many modifications and changes will immediately occur to those skilled in the art without departing from the invention. Accordingly, I intend by the appended claims to cover all such modifications and changes as fall within the true spirit and scope of the foregoing disclosure.

What I claim as new and desire to secure by Letters Patent of the United States is:

1. The method of forming an electric capacitor which comprises: continuously rolling a flexible laminate comprising a metallic layer and an insulating layer upon a rotatable driven mandrel within an evacuated enclosure to form a cylindrical body having a metallic outer surface; evaporating a dielectric material consisting essentially of amorphous zinc sulfide containing 0.01 to 10.0 weight percent of manganese and selectively directing the vapors thereof to a first portion of said cylinder following the point at which the laminate first conforms to the cylindrical shape of the body to deposit thereupon a thin layer of the dielectric; and simultaneously evaporating an easily volatizable metal and selectively directing the vapors thereof to a second portion of said cylinder angularly displaced in the direction of rotation of the body from said first portion to deposit a thin metallic layer upon said dielectric layer.

2. The method of forming an electric capacitor which comprises: continuously rolling a flexible laminate including a metallic layer and an insulating layer upon a rotatable driven mandrel within an evacuated enclosure to form a cylindrical body having a metallic outer surface; evaporating a dielectric material consisting essentially of amorphous zinc sulfide containing 0.01 to 10.0 weight percent of manganese and selectively directing the vapors thereof to a first portion of said cylinder following the point at which the laminate first conforms to the cylindrical shape of said body to deposit thereupon a thin layer of said dielectric, said insulating layer of the flexible laminate being at least as thick as the dielectric layer so deposited; and simultaneously evaporating an easily volatizable metal and selectively directing the vapors thereof to a second portion of said cylinder angularly displaced in the direction of rotation of the body from said first portion to deposit a thin metallic layer upon said dielectric layer.

3. The method of forming an electric capacitor which comprises: continuously rolling a thin metal foil having on one side thereof a nonconducting electrically insulating film upon a rotatable driven mandrel within an evacuated enclosure to form a cylindrical body having a metallic outer surface; evaporating a dielectric material consisting essentially of amorphous zinc sulfide containing 0.01 to 10.0 weight percent of manganese and selectively directing the vapors thereof to a first portion of said cylinder following the point at which the metal foil first conforms to the cylindrical shape of said body to deposit a thin layer of the dielectric thereupon, said nonconducting electrically insulating film on one side of said metal foil being at least as thick as the dielectric layer so deposited; simultaneously evaporating an easily volatizable metal and selectively directing the vapors thereof to a second portion of said cylinder angularly displaced in the direction of rotation of the body from said first portion to deposit a thin metallic layer upon said dielectric layer.

References Cited in the file of this patent

UNITED STATES PATENTS

| | | |
|---|---|---|
| 1,784,611 | Polanyi et al. | Dec. 9, 1930 |
| 2,732,312 | Young | Jan. 24, 1956 |
| 2,740,928 | Ward | Apr. 3, 1956 |